(12) United States Patent
Dakwar et al.

(10) Patent No.: US 11,446,745 B2
(45) Date of Patent: Sep. 20, 2022

(54) TURNING INSERT HAVING PENINSULA AND ISLAND PROTRUSIONS, AND TURNING TOOL

(71) Applicant: Iscar, Ltd., Tefen (IL)

(72) Inventors: Amjad Dakwar, Tarshiha (IL); Daniel Hen, Nahariya (IL)

(73) Assignee: Iscar, Ltd., Tefen (IL)

( * ) Notice: Subject to any disclaimer, the term of this patent is extended or adjusted under 35 U.S.C. 154(b) by 604 days.

(21) Appl. No.: 16/532,665

(22) Filed: Aug. 6, 2019

(65) Prior Publication Data

US 2020/0101540 A1 Apr. 2, 2020

Related U.S. Application Data

(60) Provisional application No. 62/737,329, filed on Sep. 27, 2018.

(51) Int. Cl.
*B23B 27/16* (2006.01)
*B23B 27/22* (2006.01)

(52) U.S. Cl.
CPC ...... *B23B 27/1622* (2013.01); *B23B 27/1607* (2013.01); *B23B 2200/0457* (2013.01);
(Continued)

(58) Field of Classification Search
CPC ........ B23B 2200/081; B23B 2200/208; B23B 2200/321; B23B 2200/32;
(Continued)

(56) References Cited

U.S. PATENT DOCUMENTS 5,032,049 A 7/1991 Hessman et al.
5,116,167 A * 5/1992 Niebauer .............. B23B 27/143
D15/139

(Continued)

FOREIGN PATENT DOCUMENTS

CN 102120267 7/2011
CN 204108342 U 1/2015
(Continued)

OTHER PUBLICATIONS

International Search Report dated Jan. 22, 2020, issued in PCT counterpart application (No. PCT/IL2019/050971).
(Continued)

*Primary Examiner* — Sara Addisu
(74) *Attorney, Agent, or Firm* — Womble Bond Dickinson (US) LLP

(57) ABSTRACT

A turning insert has two opposite main surfaces and a peripheral surface which extends therebetween and has N side surfaces, where 2<N<9. The insert has mirror symmetry about a mid-plane and 360/N degree rotational symmetry about a central axis perpendicular to the mid-plane. The insert has two main edges which each have N main cutting edges and N corner cutting edges. Each main cutting edge has two raised edge portions and a lowered edge portion. Each main surface has N main rake surfaces and N corner rake surfaces. Each main surface further has at least N convex island protrusions and N at least partially convex peninsula protrusions, any and all island protrusions associated with a given main rake surface being located between two adjacent peninsula protrusions, each pair of adjacent peninsula protrusions having at least one island protrusion located therebetween.

20 Claims, 3 Drawing Sheets

(52) U.S. Cl.
CPC ..... *B23B 2200/08* (2013.01); *B23B 2200/081* (2013.01); *B23B 2200/201* (2013.01); *B23B 2200/321* (2013.01)

(58) Field of Classification Search
CPC ........ B23B 2200/201; B23B 2200/204; B23B 27/143; B23B 27/1607; B23B 27/1618; B23B 27/1637; B23B 27/1648; B23B 27/22; B23B 2200/087; B23B 2200/166
See application file for complete search history.

(56) References Cited

U.S. PATENT DOCUMENTS

| | | | | |
|---|---|---|---|---|
| 5,122,017 | A * | 6/1992 | Niebauer | B23B 27/143 407/115 |
| 5,147,159 | A * | 9/1992 | Lowe | B23B 27/143 D15/139 |
| 5,192,171 | A * | 3/1993 | Ther | B23B 27/143 D15/139 |
| 5,265,985 | A * | 11/1993 | Boppana | B23B 27/143 D15/139 |
| 5,282,703 | A * | 2/1994 | Itaba | B23B 27/143 407/115 |
| 5,324,144 | A * | 6/1994 | Katbi | B23B 27/143 407/116 |
| 5,743,681 | A * | 4/1998 | Wiman | B23B 27/143 407/116 |
| 5,947,651 | A * | 9/1999 | Murakami | B23B 27/143 407/115 |
| 6,065,907 | A * | 5/2000 | Ghosh | B23B 27/141 407/115 |
| 6,123,488 | A * | 9/2000 | Kasperik | B23B 27/141 407/115 |
| 6,196,771 | B1 | 3/2001 | Andersson | |
| 6,234,726 | B1 * | 5/2001 | Okada | B23B 27/143 407/115 |
| 6,957,935 | B2 * | 10/2005 | Sung | B23C 5/202 407/113 |
| 8,967,920 | B2 * | 3/2015 | Krishtul | B23B 27/143 407/115 |
| 9,120,153 | B2 * | 9/2015 | Park | B23B 27/141 |
| 9,630,257 | B2 | 4/2017 | Tensaka | |
| 2005/0254909 | A1 * | 11/2005 | Krahula | B23B 27/143 407/114 |
| 2009/0226269 | A1 * | 9/2009 | Iyori | B23B 27/143 407/113 |
| 2011/0070039 | A1 * | 3/2011 | Park | B23B 27/141 407/113 |
| 2011/0070040 | A1 * | 3/2011 | Park | B23B 27/143 407/113 |
| 2012/0114435 | A1 | 5/2012 | Park | |
| 2015/0023744 | A1 * | 1/2015 | Wu | B23B 27/143 407/116 |
| 2015/0075338 | A1 * | 3/2015 | Onodera | B23B 27/22 407/100 |
| 2015/0078844 | A1 * | 3/2015 | Majima | B23B 27/1607 407/114 |
| 2015/0090081 | A1 * | 4/2015 | Onodera | B23B 27/143 407/66 |
| 2015/0174664 | A1 * | 6/2015 | Nam | B23C 5/202 407/116 |
| 2019/0009345 | A1 * | 1/2019 | An | B23B 27/143 |
| 2019/0054542 | A1 * | 2/2019 | Huber | B23B 5/12 |
| 2020/0406368 | A1 * | 12/2020 | Matsuda | B23B 27/1611 |
| 2021/0086269 | A1 * | 3/2021 | Maeno | B23B 27/1611 |

FOREIGN PATENT DOCUMENTS

| | | | |
|---|---|---|---|
| CN | 205464389 U | 8/2016 | |
| CN | 107414114 | 12/2017 | |
| EP | 3508292 A1 * | 7/2019 | ............ B23B 27/14 |
| JP | 2003220503 A * | 8/2003 | ........... B23B 27/141 |
| JP | 2012121131 A * | 6/2012 | ........... B23B 27/141 |

OTHER PUBLICATIONS

Written Opinion dated Jan. 22, 2020, issued in PCT counterpart application (No. PCT/IL2019/050971).

* cited by examiner

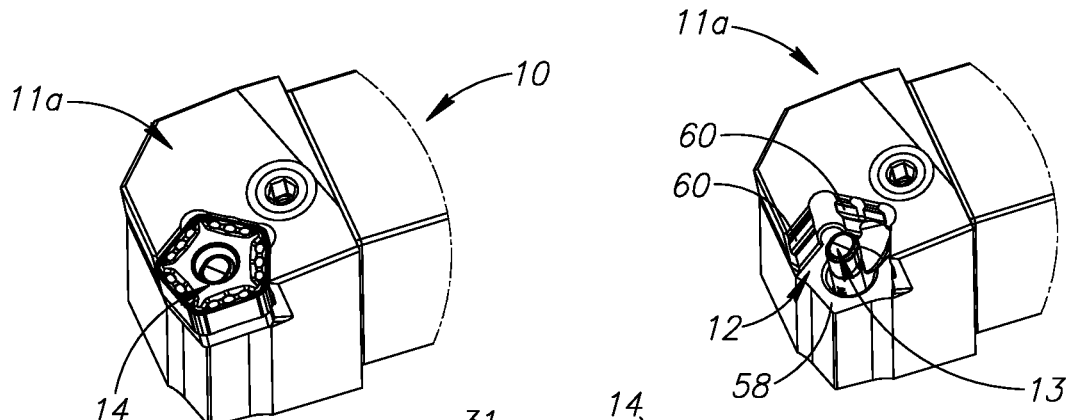
FIG.1
FIG.2
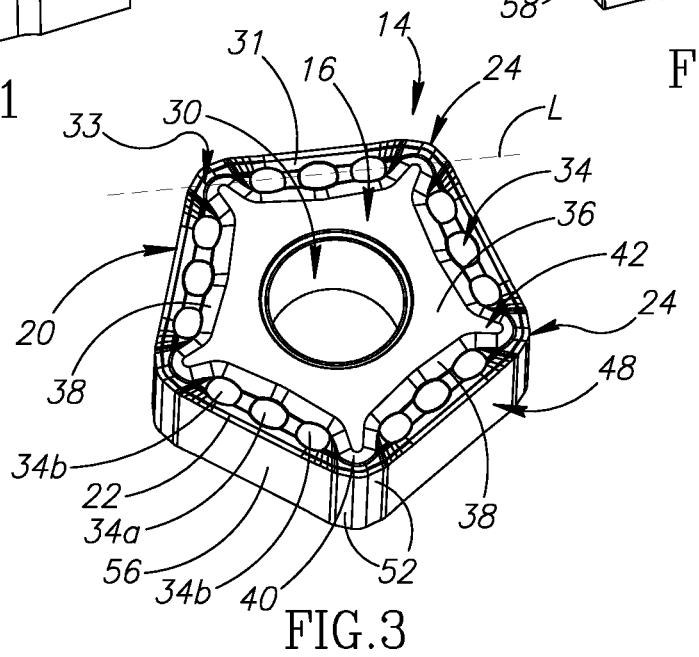
FIG.3
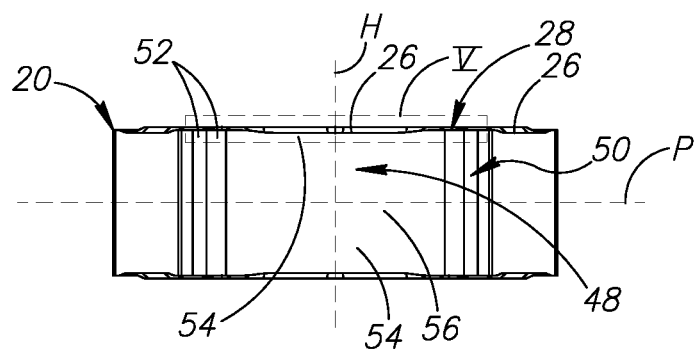
FIG.4
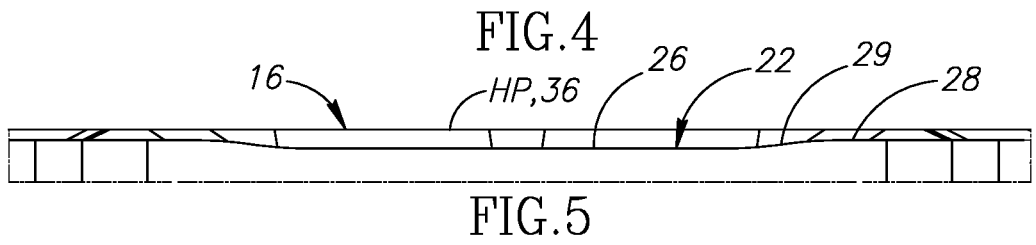
FIG.5

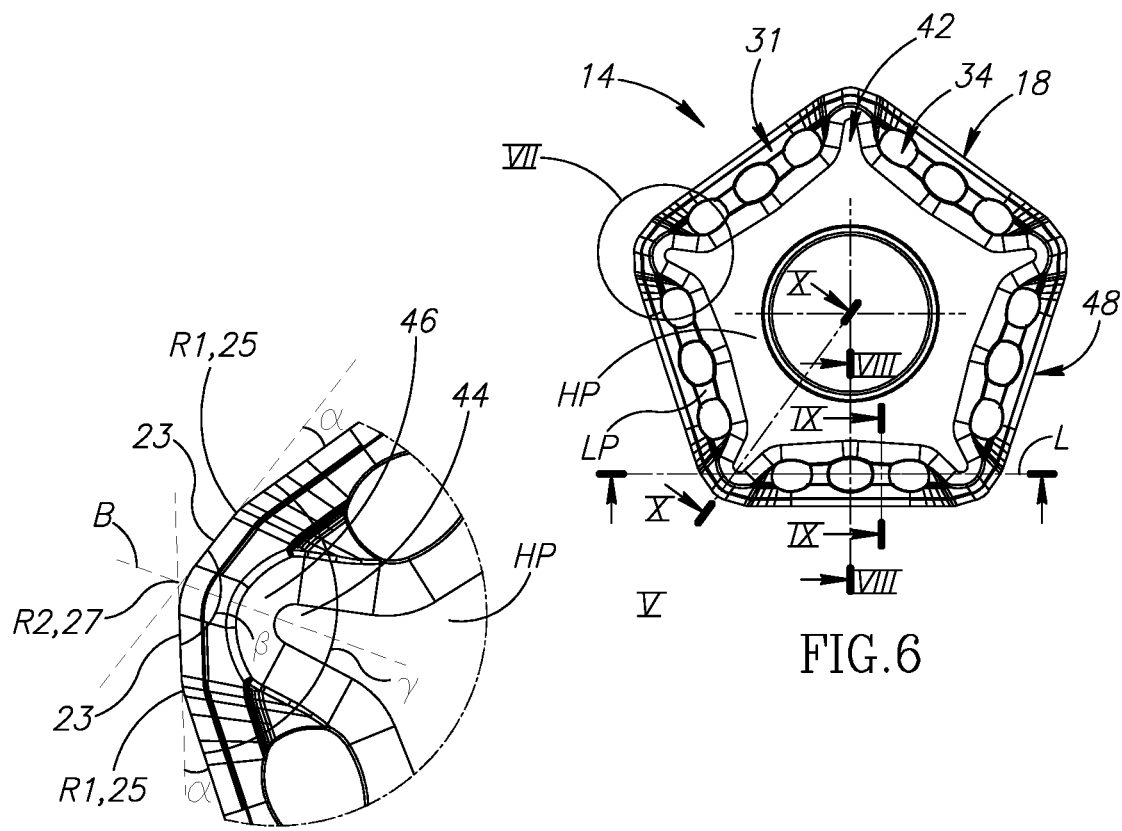
FIG.6
FIG.7
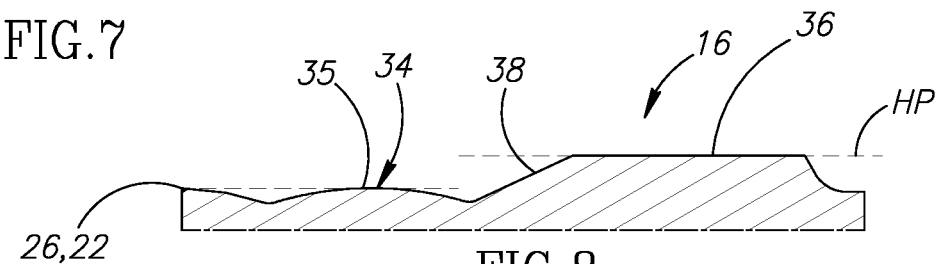
FIG.8
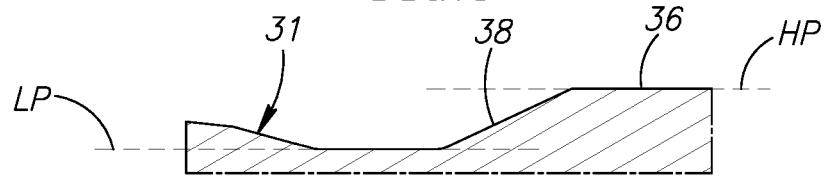
FIG.9
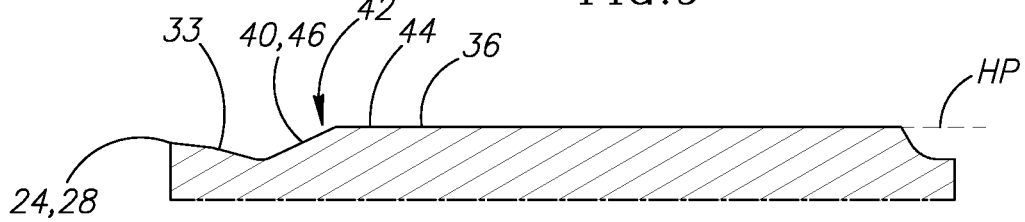
FIG.10

TURNING INSERT HAVING PENINSULA AND ISLAND PROTRUSIONS, AND TURNING TOOL

RELATED APPLICATIONS

The present application claims priority to U.S. Provisional application No. 62/737,329, filed Sep. 27, 2018. The contents of the aforementioned application are incorporated by reference in their entirety.

FIELD OF THE INVENTION

The subject matter of the present application relates to turning machining tools and inserts. Specifically, it relates to turning inserts with chip breakers or chip formers.

BACKGROUND OF THE INVENTION

Turning inserts of the field are disclosed, for example, by U.S. Pat. No. 9,630,257.

SUMMARY OF THE INVENTION

In accordance with a first aspect of the subject matter of the present application there is provided a turning insert having a central axis, the turning insert comprising:

two opposite polygonal main surfaces and a peripheral surface extending therebetween, the peripheral surface extending circumferentially about the central axis and having an integer number N side surfaces, where 2<N<9; the turning insert having mirror symmetry about a mid-plane oriented perpendicular to the central axis and passing midway between the two main surfaces through the peripheral surface and 360/N degree rotational symmetry about the central axis; and two main edges, each being formed at respective intersections between the peripheral surface and the two main surfaces, each main edge comprising:

N main cutting edges and N corner cutting edges, each corner cutting edge extending between, and connecting, two adjacent main cutting edges, each main cutting edge comprising two raised edge portions and a lowered edge portion extending therebetween, the raised edge portions being located farther from the mid-plane than the lowered edge portion in a direction along the central axis; wherein:

each main surface comprises:
  N main rake surfaces, each extending from a respective main cutting edge towards the central axis;
  N corner rake surfaces, each extending from a respective corner cutting edge towards the central axis and located between two adjacent main rake surfaces;
  N at least partially convex peninsula protrusions, each projecting from the main surface and extending in a direction from the central axis towards an associated corner cutting edge; and
  at least N convex island protrusions, each projecting from the main surface and at least partially on an associated main rake surface, any and all island protrusions associated with a given main rake surface being located between two adjacent peninsula protrusions (42), each pair of adjacent peninsula protrusions having at least one island protrusion located therebetween.

Any of the following features, either alone or in combination, may be applicable to any of the above aspects of the subject matter of the application:

Each corner cutting edge can have two wiper edges, the two wiper edges defining a corner angle which can have a range between 135 and 160 degrees and preferably between 135 and 145 degrees.

Each peninsula protrusion preferably is located on an associated corner rake surface.

Each main surface has a main abutment surface which is parallel to the mid-plane, and each peninsula protrusion can have at least a planar portion which is coplanar with a respective main abutment surface.

Each island protrusion can be spaced apart from the main abutment surface.

For any given main cutting edge, each of the two raised edge portions and the lowered edge portions can be connected by a respective transition edge portion.

No island protrusion extends farther from the mid-plane than a lowered edge portion in a direction perpendicular to the mid-plane.

Each peninsula protrusion extends farther from the mid-plane than an adjacent raised edge portion in a direction perpendicular to the mid-plane in a direction perpendicular to the mid-plane.

In a plan view of the turning insert perpendicular to the mid-plane, each island protrusion can have an oval shape.

In a plan view of the turning insert perpendicular to the mid-plane, a largest dimension of each island protrusion is in a longitudinal direction which extends parallel to an adjacent lowered edge portion.

Each main surface has a planar main abutment surface which is parallel to the mid-plane and located farther therefrom than the island protrusions.

Each rake surface comprises a main rake surface which extends from a respective main cutting edge and a corner rake surface which extends from a respective corner cutting edge.

N can equal 5.

Each main surface comprises at least 2*N island protrusions distributed equally between all the pairs of adjacent peninsula protrusions.

Each main surface can have exactly 3*N island protrusions distributed equally between all the pairs of adjacent peninsula protrusions.

The insert is devoid of an island protrusion between the center axis and any of the corner cutting edges.

A turning tool has a turning tool body or a high-feed turning tool body with a pocket and the turning insert secured in the pocket.

The pocket has a pocket base abutment surface and abutment walls which extend transversely outwardly away from the base abutment surface; and wherein the pocket base abutment surface abuts one of the two main abutment surfaces of the turning insert, and the peripheral surface engages the abutment walls.

The pocket has a fastening member which forces the insert against the pocket base abutment surface and against the abutment walls.

The pocket of the high-feed turning tool body has a different orientation than that of the pocket of the turning tool body, each configured for respective different machining applications.

BRIEF DESCRIPTION OF THE DRAWINGS

For a better understanding of the subject matter of the present application and to show how the same may be carried out in practice, reference will now be made to the accompanying drawings, in which:

FIG. 1 is an isometric view of a turning tool with a high-feed turning tool body and a turning insert secured in a pocket thereof;

FIG. 2 is an isometric view of the high-feed turning tool body of FIG. 1;

FIG. 3 is an isometric view of the turning insert of FIG. 1;

FIG. 4 is a side view of the turning insert of FIG. 1;

FIG. 5 is a detail view according to line V of FIG. 4;

FIG. 6 is a plan view of one of the main surfaces of the turning insert of FIG. 1;

FIG. 7 is a detail view according to line VII of FIG. 6 showing a peninsula protrusion;

FIG. 8 is a cross section view taken along line VIII-VIII of FIG. 6 showing an island protrusion extending from a main rake surface;

FIG. 9 is a cross section view taken along line IX-IX of FIG. 6, between two island protrusions;

FIG. 10 is a cross section view taken along line X-X of FIG. 6 showing the peninsula protrusion extending from a corner rake surface and merging with a main abutment surface;

FIG. 11 is a plan view of the high feed turning tool of FIG. 1 with the turning insert of FIG. 4 and of a cross section of a workpiece on which high feed machining operations are being performed on; and FIG. 12 is a plan view of an embodiment of a standard, non-high-feed, turning tool body with the insert of FIG. 4, and a cross section of a workpiece on which standard turning operation is being performed on.

Figure 11:
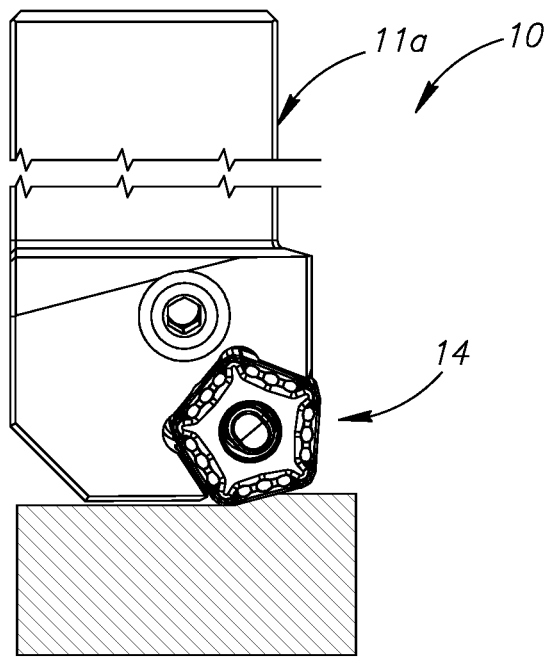

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Attention is drawn to FIG. 1. According to some embodiments, a turning tool 10 has a high-feed turning tool body 11a or a turning tool body 11b with a pocket 12 and a turning insert 14 secured therein. The turning insert 10 has a central axis H.

The turning insert 14 includes two opposite main surfaces 16 and a peripheral surface 18 which extends therebetween. The peripheral surface 18 extends circumferentially about the central axis H. Each main surface 16 has a generally polygonal shape in a plan view thereof. In particular, each main surface 16 has a generally regular polygonal shape. Each main surface 16 can have a pentagonal shape in a plan view thereof. The turning insert 14 exhibits mirror symmetry about a mid-plane P which is oriented perpendicular to the central axis H and which passes midway between the two main surfaces 16 through the peripheral surface 18. Each main surface 16 defines parallel lowest and highest portion planes LP, HP, respectively located closest and farthest from the mid-plane P in a direction along the central axis H. As measured in a direction along the central axis H, a distance between the highest portion plane HP and the mid-plane P is greater than a distance between the lowest portion plane LP and the mid-plane P. The lowest and highest portion planes LP, HP are parallel to the mid-plane P. Each main surface 16 is formed only between the lowest and highest portion planes LP, HP.

The intersection between each main surface 16 and the peripheral surface 18 forms a main edge 20. Thus, the turning insert 14 has two main edges 20. Each main edge 20 has 2<N<9 straight main cutting edges 22 and N corner cutting edges 24, where N is a positive integer. The main cutting edges 22 lie on, and thus form, an imaginary polygon. Every corner cutting edge 24 connects, and extends between, two adjacent main cutting edges 22. In the present embodiment, each main edge 20 includes five main cutting edges 22 and five corner cutting edges 24.

Each main cutting edge 22 includes a lowered edge portion 26 and two raised edge portions 28. Each lowered edge portion 26 is located between, and connected to, two adjacent raised edge portions 28 belonging to the same main cutting edge 22. Each lowered edge portion 26 can be connected to an adjacent raised edge portion 28 via a transition edge portion 29. Each raised edge portion 28 is adjacent a single corner cutting edge 24, with adjacent raised edge portions 28 belonging to adjacent main cutting edges 22 sharing a single corner cutting edge 24. During many testing runs, under various machining conditions, it was found that the lowered edge portion 26 was advantageous with lowering machine power requirements and with prolonging insert and tool life. The advantage of the lowered edge portion 26 was best realized, when combined with other features as will further be explained below.

Each corner cutting edge 24 includes two wiper edges 23. Each wiper edge 23 can be straight in a view parallel to the central axis H. Each wiper edge 23 is connected to a main cutting edge 22 via first corner edge 25 which has a first radius R1. Each wiper edge 23 is also connected to an adjacent wiper edge 23 via a second corner edge 27 which has a second radius R2. In the same view, each wiper edge 23 has a tangent line which forms a wiper angle $\alpha$ with an adjacent straight main cutting edge 22. According to the present example, the wiper angle $\alpha$ equals 16 degrees. An interior polygon angle $\gamma$ is defined between every two adjacent main cutting edges 22. For a regular polygon, $\gamma=(N-2)*180/N$. For the present pentagonal shape, N=5 and the polygon angle $\gamma$ therefore equals 108 degrees.

Each lowered edge portion 26 can be straight in a view parallel to the mid-plane P. Furthermore, each lowered edge portion 26 can be straight in a view perpendicular to the mid-plane P. According to the present embodiments, each lowered edge portion 26 is not located in, or overlaps, a corner cutting edge 24. Stated differently, each lowered edge portion 26 can be located only within the boundaries of a respective main cutting edge 22.

Each raised edge portion 28 can be straight in a view parallel to the mid-plane P. The raised edge portions 28 are located farther from the mid-plane P than the lowered edge portion 26 in a direction perpendicular to the mid-plane P (i.e. along the central axis H). The raised edge portions 28 can be located at the same height, or distance, from the mid-plane P. In the current embodiment, in a view parallel to the mid-plane P, all the raised edge portions 28 lie in a single plane, which is parallel to the mid-plane P. It is hereby noted that the terms 'same height', and/or 'lie in a single plane' are to be understood as approximate terms—within production/development tolerances.

The turning insert 14 can have a through clamping hole 30 which extends between, and opens out to, both main surfaces 16. The clamping hole 30 has a least a circular cross section, and extends along the central axis H which is perpendicular to the mid-plane P. In a plan view of any one of the main surfaces 16 perpendicular to the mid-plane P, the central axis H defines a center of the insert 14. In the same view, the insert 14 has 360/N degrees of rotational symmetry about the central axis H.

Each main surface 16 includes N main rakes surfaces 31 and N corner rake surfaces 31. Each main rake surface 31 extends from a respective main cutting edge 22 towards the clamping hole 30. Each corner rake surface 33 extends from a respective corner cutting edge 24 towards the clamping hole 30. Each corner rake surface 33 is located between two main rake surfaces 31.

Each main surface 16 further includes at least N distinct island protrusions 34, each of which projects on all sides from the surrounding main surface 16. The term "distinct" is used in the sense that no island protrusion 34 touches (i.e. intersects) another island protrusion 34. In accordance with some embodiments of the subject matter of the present application, each main surface 16 can include at least 2*N island protrusions 34. In particular, each main surface 16 can include exactly 3*N distinct island protrusions 34. Each island protrusion 34 is located at least partially on an associated main rake surface 31. Furthermore, not all island protrusions 34 necessarily have the exact same size. Each main cutting edge 22 is associated with, or located adjacent to, at least one island protrusion 34. In accordance with some embodiments of the subject matter of the present application, the island protrusions 34 can be spaced apart from the main cutting edge 22. During tests, it was found that the island protrusions 34 were advantageous in breaking chips. Specifically, the combination between the island protrusions 34 and the lowered edge portions 26 improved overall machining results and led to better chip flow and breakage. Furthermore, this combination of features also improved the insert's orientation versatility as will be explained below.

In the present embodiment, each main cutting edge 22 is associated with three island protrusions 34. In the present embodiment, a middle island protrusion 34a is larger than the other adjacent side island protrusions 34b which are closer to the raised edge portions 28. The insert 14 is devoid of an island protrusion 34 between the central axis H and any of the corner cutting edges 24. Thus, a radial line extending between the central axis H and a given corner cutting edge 24 does not intersect an island protrusion 34. In other words, in a plan view of each main surface 16, a bi-sector axis B which bisects a respective corner cutting edge 24 does not pass through an island protrusion 34. A corner angle β is formed between two straight lines, respectively tangent to adjacent wiper edges 23. The corner angle β satisfies the following formula: β=2*α+γ. The corner angle β can range between 135 and 160 degrees. According to the present embodiment, the corner angle equals 140 degrees. The bi-sector B does not intersect any of the island protrusions 34 associated with the main cutting edges 22. Each island protrusion 34 can project partially from the lowest portion plane LP. Attention is drawn to FIG. 6. In a plan view of each main surface 16, each island protrusion 34 has an oval shape, which was empirically found as advantageous in shaping and breaking cut workpiece chips, at least with respect to round-shaped protrusions. In the same view, each island protrusion 34 can have a largest dimension in a longitudinal direction L which can extend in a direction parallel to the main cutting edge 22. According to the present embodiment, in a cross-section perpendicular to the longitudinal direction L (FIG. 8), each island protrusion 34 does not include a planar upper surface, and so is considered to be a "convex" island protrusion. The island protrusion 34 has an island-like shape, in a sense that it projects on all sides above the surrounding main surface 16. As seen in the figures, the convex island protrusion 34, while lacking a planar upper surface, can include a peak 35 which is surrounded by surfaces sloping towards the mid-plane P, and in that the peak 35 is the highest portion, or located farther from the mid-plane P than any other portion of the island protrusion 34.

Attention is drawn to FIG. 8. In the direction of the central axis H, each island protrusion 34 does not project farther from the mid-plane P than the main edge 20. Stated differently, in a view parallel to the mid-plane P of the insert (FIGS. 4, 5), the island protrusion 34 is not visible. Specifically, the peak 35 reaches, but domes't pass, the respective main cutting edge 22.

Each main surface 16 has a main abutment surface 36. The main abutment surface 36 can be planar, and parallel to the mid-plane P. In a direction along the central axis H, the main abutment surface 36 is located farther from the mid-plane P than any island protrusion 34. In the same direction, the main abutment surface 36 is located farther from the mid-plane P than the closest main edge 20. According to the present embodiments, the main abutment surface 36 coincides with the highest portion plane HP. The clamping hole 30 can open out to the main abutment surface 36.

Each main surface 16 includes N main deflecting surfaces 38 and N corner deflecting surfaces 40. Each corner deflecting surface 40 extends between two adjacent main deflecting surfaces 38. Each of the main and corner deflecting surface 40 slopes, or extends downwards from the main abutment surface 36, or the highest portion plane HP, towards the lowest portion plane LP. Each main deflecting surface 38 at least partially connects with an island protrusion 34. Furthermore, since the island protrusions 34 are spaced apart from each other along a direction parallel to the main cutting edge 22, each main deflecting surface 38 at least partially passes between two adjacent island protrusions 34 and connects with the lowest portion plane LP (FIGS. 3, 6).

Each main surface 16 has N peninsula protrusions 42 projecting therefrom. Each peninsula protrusions 42 is associated with a respective corner cutting edge 24. Each peninsula protrusion 42 can be located directly on an associated corner rake surface 33. Each peninsula protrusion 42 extends in a direction from the central axis H towards an associated corner cutting edge 24. Each peninsula protrusion 42 is located between two adjacent island protrusions 34. Each peninsula protrusion 42 can have a peninsula-like shape, in the sense that the peninsula protrusion 42 does not project on all sides from the surrounding main surface 16, unlike the island protrusion 34 described above. The peninsula protrusions 42 may include both planar and non-planar upper surfaces. As an example of the foregoing, each peninsula protrusion 42 can extend from, and at least partially merge with, the main abutment surface 36. As seen in the cross-section of FIG. 10, a first portion 44 of the peninsula protrusion 42 is seen to be coplanar with the main abutment surface 36 while a second portion 46 of the peninsula protrusion 42 is downwardly sloped relative to the first portion 46. Thus, each peninsula protrusion 42 can have a planar portion 44 and a convex portion 46, rendering the peninsula protrusion "partially convex". However, in other embodiments, the peninsula protrusions may have only non-planar upper surfaces, i.e., have only convex portions, in which case they are considered to be "completely convex". Any and all island protrusions 34 located along a given main cutting edge 22 and associated with a given main rake surface 31 are located between two adjacent peninsula protrusions 42 (thus, it is understood that even though the middle island protrusion 34a is strictly speaking located between two side island protrusions 34b, it is still considered to be located between two adjacent peninsula protrusions 42). The island protrusions 34 are arranged such that each pair of adjacent peninsula protrusions 42 has at least one island protrusion 34 located therebetween. The island protrusions 34 can be distributed equally between all the pairs of adjacent peninsula protrusions 42. In accordance with some embodiments of the subject matter of the present application, the peninsula protrusions 42 can be spaced apart from the corner cutting edge 24. In contrast to the island protrusions 34 which are associated with the sides of the main surface 16 and can be regarded as "side island protrusions", the peninsula protrusions 42 are associated with the corners of the main surface 16 and can be regarded as "corner peninsula protrusions".

The peripheral surface 18 has N side surfaces 48 and N corner surfaces 50. Each corner surface 50 extends between every two adjacent side surfaces 48. Each corner surface 50 has four wiper relief surfaces 52, each of which extends from a respective wiper edge 23 towards the mid-plane P. Each side surface 48 meets each of the two main surfaces 16 at two main cutting edges 22 opposite one another along the center axis H. Each side surface 48 has two main relief surfaces 54, each of which extends from a respective main cutting edge 22. Each side surface 48 further has a side abutment surface 56 located between the two main relief surfaces 54.

The turning insert 14 is a negative insert as known in the art. Specifically, the main relief surfaces 54 are straight, and perpendicular to the mid-plane P.

The turning tool body 11a, 11b can have an elongated shape. At a machining end, the turning tool body 11a, 11b has the pocket 12. The pocket 12 includes a pocket base abutment surface 58 and abutment walls 60. The pocket 12 further includes securing means. According to the present embodiments, the pocket 12 has a securing means in the form of fastening member 13 which is screw threaded into a fastening bore which opens out to the pocket base abutment surface 58. The abutment walls 60 extend transversely with respect to the base abutment surface 58. The pocket 12 can have two abutment walls 60 which extend transversely to each other. In a secured position, the main abutment surface 36 abuts the pocket base abutment surface 58 and the side abutment surface 56 abut the abutment walls 60.

Figure 12:
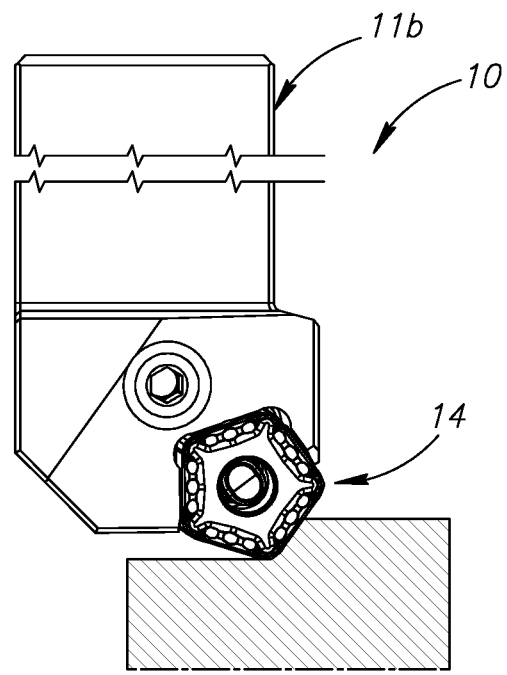

Attention is drawn to FIGS. 11 and 12. The pocket 12 of the high feed turning tool body 11a is oriented in the high-feed tool body 11a according to high feed applications as known in the art. In FIG. 12, the non-high-feed turning tool body 11b is shown with the same insert 14 mounted in the pocket 12. In the non-high-feed turning tool body 11b, the pocket orientation is different from that of the pocket 12 in the high-feed tool and suited for non-high-feed, standard turning operations. This is advantageous in terms of insert costs, since a client only has to buy a single insert type, which is suitable for both applications. The double-wiper edge design ensures high surface finish for both the high-feed and standard orientations.

What is claimed is:

1. A turning insert (14) having a central axis (H), the turning insert (14) comprising:

two opposite polygonal main surfaces (16) and a peripheral surface (18) extending therebetween, the peripheral surface (18) extending circumferentially about the central axis (H) and having an integer number N side surfaces, where 2<N<9; the turning insert (14) having mirror symmetry about a mid-plane (P) oriented perpendicular to the central axis (H) and passing midway between the two main surfaces (16) through the peripheral surface (18) and 360/N degree rotational symmetry about the central axis (H); and two main edges (20), each being formed at respective intersections between the peripheral surface (18) and the two main surfaces (16), each main edge (20) comprising:

N main cutting edges (22) and N corner cutting edges (24), each corner cutting edge (24) extending between, and connecting, two adjacent main cutting edges (22), each main cutting edge (22) comprising two raised edge portions (28) and a lowered edge portion (26) extending therebetween, the raised edge portions (28) being located farther from the mid-plane (P) than the lowered edge portion (26) in a direction along the central axis (H);

wherein:

each main surface (16) comprises:

N main rake surfaces (31), each rake surface (31) extending from a respective main cutting edge (22) towards the central axis (H);

N corner rake surfaces (33), each corner rake surface (33) extending from a respective corner cutting edge (24) towards the central axis (H) and located between two adjacent main rake surfaces (31);

N at least partially convex peninsula protrusions (42), each projecting from the main surface (16) and extending in a direction from the central axis (H) towards an associated corner cutting edge (24); and at least N convex island protrusions (34), each at least partially on an associated main rake surface (31), each having an oval shape in a plan view of the turning insert (14) perpendicular to the mid-plane (P), any and all island protrusions (34) associated with a given main rake surface (31) being located between two adjacent peninsula protrusions (42), each pair of adjacent peninsula protrusions (42) having at least one island protrusion (34) located therebetween.

2. The turning insert (14) according to claim 1, wherein each corner cutting edge (24) comprises two wiper edges (23), the two wiper edges (23) defining a corner angle (β) which has a range between 135 and 160 degrees.

3. The turning insert (14) according to claim 2, wherein the corner angle (β) has a range between 135 and 145 degrees.

4. The turning insert (14) according to claim 1, wherein each peninsula protrusion (42) is located on an associated corner rake surface (33).

5. The turning insert (14) according to claim 1, wherein each main surface (16) comprises a planar main abutment surface (36) which is parallel to the mid-plane (P), and each peninsula protrusion (42) comprises at least a planar portion which is coplanar with, and partially merges with, a respective planar main abutment surface (36).

6. The turning insert (14) according to claim 5, wherein each island protrusion (34) is spaced apart from the main abutment surface (36).

7. The turning insert (14) according to claim 1, wherein for any given main cutting edge (22), each of the two raised edge portions (28) and the lowered edge portions (26) is connected by a respective transition edge portion (29).

8. The turning insert (14) according to claim 1, wherein no island protrusion (34) extends farther from the mid-plane (P) than a lowered edge portion (26), in a direction perpendicular to the mid-plane (P).

9. The turning insert (14) according to claim 1, wherein each peninsula protrusion (42) extends farther from the mid-plane (P) than an adjacent raised edge portion (28), in a direction perpendicular to the mid-plane (P).

10. The turning insert (14) according to claim 1, wherein in a plan view of the turning insert (14) perpendicular to the mid-plane (P), a largest dimension of each island protrusion (34) is in a longitudinal direction (L) which extends parallel to an adjacent lowered edge portion (26).

11. The turning insert (14) according to claim 1, wherein each main surface (16) comprises a planar main abutment surface (36) which is parallel to the mid-plane (P) and located farther therefrom than the island protrusions (34), in a direction perpendicular the mid-plane (P).

12. The turning insert (14) according to claim 1, wherein N equals 5.

13. The turning insert (14) according to claim 1, wherein each main surface (16) comprises at least 2*N island protrusions (34) distributed equally between all the pairs of adjacent peninsula protrusions (42).

14. The turning insert (14) according to claim 1, wherein each main surface (16) comprises exactly 3*N island protrusions (34) distributed equally between all the pairs of adjacent peninsula protrusions (42).

15. The turning insert (14) according to claim 1, wherein the insert (14) is devoid of an island protrusion (34) between the center axis (H) and any of the corner cutting edges (24).

16. A turning tool (10) comprising a high-feed turning tool body (11a) or a turning tool body (11b) with a pocket (12) and the turning insert (14) according to claim 1 secured in the pocket (24).

17. The turning tool (10) according to claim 16, wherein:
the pocket (12) comprises a pocket base abutment surface (58) and abutment walls (60) which extend transversely outwardly away from the base abutment surface (58);
the pocket base abutment surface (58) abuts one of the two main abutment surfaces (36) of the turning insert (14); and
the peripheral surface (18) engages the abutment walls (60).

18. The turning tool (10) according to claim 16, wherein the pocket (12) comprises a fastening member which forces the insert (14) against the pocket base abutment surface (58) and against the abutment walls (60).

19. A turning insert (14) having a central axis (H), the turning insert (14) comprising:
two opposite polygonal main surfaces (16) and a peripheral surface (18) extending therebetween, the peripheral surface (18) extending circumferentially about the central axis (H) and having an integer number N side surfaces, where 2<N<9; the turning insert (14) having mirror symmetry about a mid-plane (P) oriented perpendicular to the central axis (H) and passing midway between the two main surfaces (16) through the peripheral surface (18) and 360/N degree rotational symmetry about the central axis (H); and
two main edges (20), each being formed at respective intersections between the peripheral surface (18) and the two main surfaces (16), each main edge (20) comprising:
N main cutting edges (22) and N corner cutting edges (24), each corner cutting edge (24) extending between, and connecting, two adjacent main cutting edges (22), each main cutting edge (22) comprising two raised edge portions (28) and a lowered edge portion (26) extending therebetween, the raised edge portions (28) being located farther from the mid-plane (P) than the lowered edge portion (26) in a direction along the central axis (H);
wherein:
each main surface (16) comprises:
N main rake surfaces (31), each rake surface (31) extending from a respective main cutting edge (22) towards the central axis (H);
N corner rake surfaces (33), each corner rake surface (33) extending from a respective corner cutting edge (24) towards the central axis (H) and located between two adjacent main rake surfaces (31);
N at least partially convex peninsula protrusions (42), each projecting from the main surface (16) and extending in a direction from the central axis (H) towards an associated corner cutting edge (24); and
at least N convex island protrusions (34), each at least partially on an associated main rake surface (31), any and all island protrusions (34) associated with a given main rake surface (31) being located between two adjacent peninsula protrusions (42), each pair of adjacent peninsula protrusions (42) having at least one island protrusion (34) located therebetween; and
each main surface (16) comprises a planar main abutment surface (36) which is parallel to the mid-plane (P) and located farther therefrom than the island protrusions (34), in a direction perpendicular the mid-plane (P).

20. A turning insert (14) having a central axis (H), the turning insert (14) comprising:
two opposite polygonal main surfaces (16) and a peripheral surface (18) extending therebetween, the peripheral surface (18) extending circumferentially about the central axis (H) and having an integer number N side surfaces, where 2<N<9; the turning insert (14) having mirror symmetry about a mid-plane (P) oriented perpendicular to the central axis (H) and passing midway between the two main surfaces (16) through the peripheral surface (18) and 360/N degree rotational symmetry about the central axis (H); and
two main edges (20), each being formed at respective intersections between the peripheral surface (18) and the two main surfaces (16), each main edge (20) comprising:
N main cutting edges (22) and N corner cutting edges (24), each corner cutting edge (24) extending between, and connecting, two adjacent main cutting edges (22), each main cutting edge (22) comprising two raised edge portions (28) and a lowered edge portion (26) extending therebetween, the raised edge portions (28) being located farther from the mid-plane (P) than the lowered edge portion (26) in a direction along the central axis (H);
wherein:
each main surface (16) comprises:
N main rake surfaces (31), each rake surface (31) extending from a respective main cutting edge (22) towards the central axis (H);
N corner rake surfaces (33), each corner rake surface (33) extending from a respective corner cutting edge (24) towards the central axis (H) and located between two adjacent main rake surfaces (31);
N at least partially convex peninsula protrusions (42), each projecting from the main surface (16) and extending in a direction from the central axis (H) towards an associated corner cutting edge (24); and at least N convex island protrusions (34), each at least partially on an associated main rake surface (31), any and all island protrusions (34) associated with a given main rake surface (31) being located between two adjacent peninsula protrusions (42), each pair of adjacent peninsula protrusions (42) having at least one island protrusion (34) located therebetween;

no island protrusion (34) extends farther from the mid-plane (P) than a lowered edge portion (26), in a direction perpendicular to the mid-plane (P); and each peninsula protrusion (42) extends farther from the mid-plane (P) than an adjacent raised edge portion (28), in a direction perpendicular to the mid-plane (P).

* * * * *